(12) United States Patent
Bratkovski et al.

(10) Patent No.: US 7,546,012 B2
(45) Date of Patent: Jun. 9, 2009

(54) WAVEGUIDE SYSTEM WITH DIFFRACTING STRUCTURE

(75) Inventors: Alexandre M. Bratkovski, Mountain View, CA (US); Michael Renne Ty Tan, Menlo Park, CA (US); Shih-Yuan (S Y) Wang, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1 day.

(21) Appl. No.: 11/876,958

(22) Filed: Oct. 23, 2007

(65) Prior Publication Data

US 2009/0103862 A1    Apr. 23, 2009

(51) Int. Cl.
*G02B 6/34* (2006.01)
*G02B 6/26* (2006.01)
*G02B 6/42* (2006.01)

(52) U.S. Cl. .............................. 385/37; 385/15; 385/31

(58) Field of Classification Search ................... 385/37, 385/15, 31
See application file for complete search history.

(56) References Cited

U.S. PATENT DOCUMENTS

| 5,379,354 | A |   | 1/1995  | Jenkins |              |
|-----------|---|---|---------|---------|--------------|
| 5,422,472 | A | * | 6/1995  | Tavislan et al. | ......... 235/472.01 |
| 5,473,721 | A |   | 12/1995 | Meyers et al. |         |
| 6,161,910 | A |   | 12/2000 | Reisenauer et al. |     |
| 6,728,445 | B2 | * | 4/2004 | Blomquist et al. | ............ 385/37 |
| 6,871,983 | B2 |   | 3/2005 | Jacob et al. |           |
| 2004/0109643 | A1 | * | 6/2004 | Kim et al. | ..................... 385/37 |
| 2004/0208446 | A1 | * | 10/2004 | Bond et al. | .................... 385/37 |
| 2005/0252248 | A1 | * | 11/2005 | Kornreich et al. | ............. 65/435 |
| 2006/0233492 | A1 | * | 10/2006 | Schaafsma | ................... 385/37 |

* cited by examiner

*Primary Examiner*—Frank G Font
*Assistant Examiner*—Jerry Blevins

(57) ABSTRACT

An optical waveguide system includes an optical element, a three-dimensional diffracting structure positioned around the optical element, and a waveguide. The optical element and the diffracting structure are at least partially enclosed by the waveguide.

16 Claims, 10 Drawing Sheets

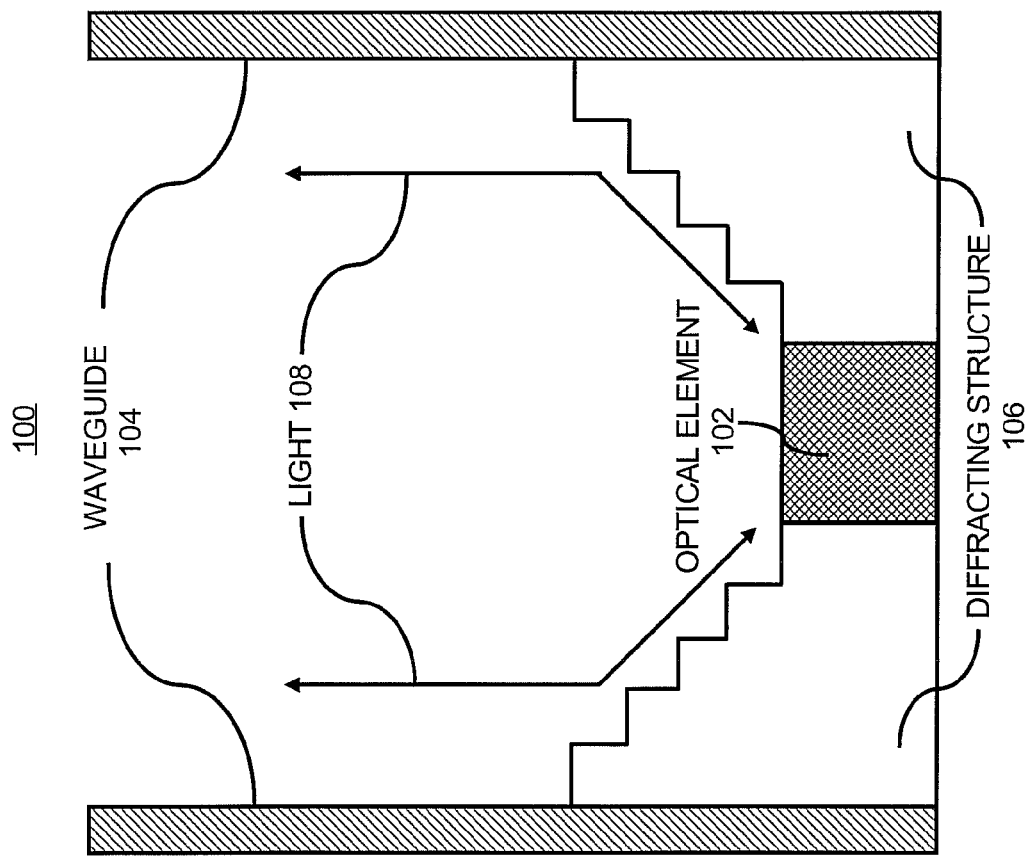

WAVEGUIDE SYSTEM WITH DIFFRACTING STRUCTURE

BACKGROUND

Waveguides are structures used to guide and facilitate the transmission of waves. Waveguides are commonly used in optical applications to channel and propagate light. Waveguides range in complexity from common optical fiber to multilayered semiconductor devices.

One drawback with conventional waveguides is that they do not efficiently couple light. That is, light directed towards a waveguide simply propagates down the waveguide by continually reflecting off the internal surfaces of the waveguide. Inherently, as the light reflects off the surfaces of the waveguide, there is signal loss. Also, the propagation distance may be reduced due to the signal loss.

Moreover, problems arise in the transfer of the light from the light source to the waveguide because the light often passes through another medium, such as air, before it enters the waveguide. To compensate for the aforementioned problems, waveguides and light sources must be fabricated to exacting specifications. The difficult manufacturing process increases the costs of conventional waveguides and light sources.

BRIEF DESCRIPTION OF THE DRAWINGS

Features of the present invention will become apparent to those skilled in the art from the following description with reference to the figures, in which:

FIG. 1A illustrates a cross-sectional side view of a waveguide system, according to an embodiment;

DETAILED DESCRIPTION

Figure 1B:
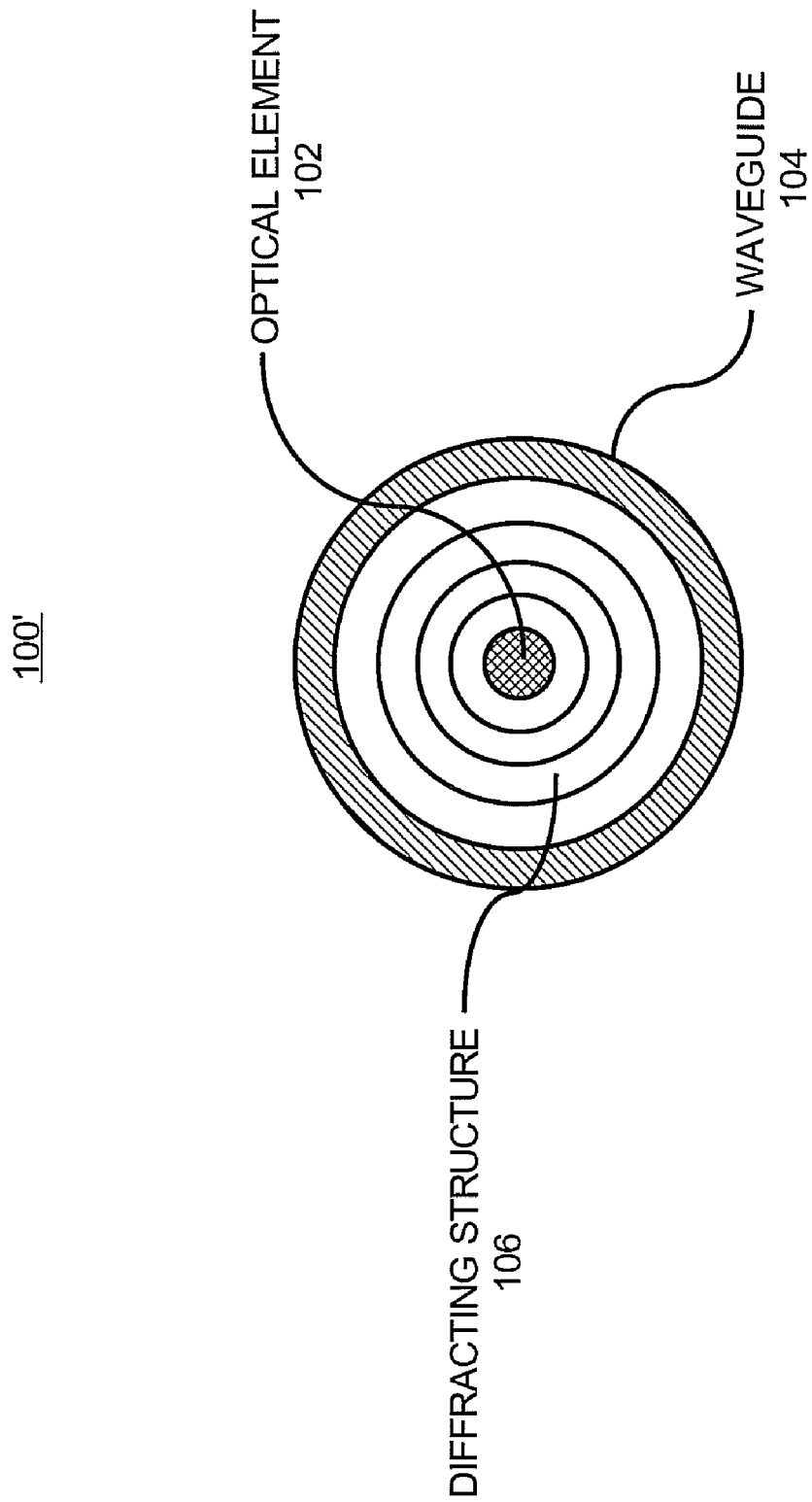
FIG. 1B illustrates a cross-sectional top view of a waveguide system, according to an embodiment.

For simplicity and illustrative purposes, the present invention is described by referring mainly to exemplary embodiments. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

Embodiments of systems and methods for transmitting and receiving light are disclosed herein. The systems may include an optical element, a diffracting structure, and a waveguide. The optical element may be any device for creating or emitting light. For example, the optical element may be a light emitting diode (LED), a laser, or the like. However, the optical element may also be a device for receiving light, such as a photodetector, filter, or the like.

According to an embodiment, the diffracting structure may be positioned around the optical element and configured to diffract light into and/or out of the optical element. For example, if the optical element is an LED, the diffracting structure may surround the light emitting region of the LED to facilitate the transmission of light away from the LED. That is, the diffracting structure may diffract light off of the surfaces of the diffracting structure in a predetermined direction. However, if the optical element is a device configured to receive light, such as a photodetector, the optical element may facilitate the transmission of light into the photodetector. The diffracting structure may be a three-dimensional structure having a wide range of varying dimensions, as described in greater detail below.

The waveguide is configured to propagate wavelengths of light. According to an embodiment, the waveguide may at least partially encapsulate the optical element and the diffracting structure. For example, the waveguide may be hollow metallic tube with the optical element and the diffracting structure positioned inside of the hollow metallic waveguide. Although, the waveguide may have many different configurations, in one example, the waveguide may be cylindrical with one dimensions, such as length, substantially longer than another dimension, such as diameter. In this sense, the optical element, the diffracting structure, and the waveguide may be integrated such that the light propagating through the waveguide is efficiently directed into and/or out of the optical element. Thus, loss is reduced because light is inhibited from escaping the system due to the integration and encapsulation of the optical element by the waveguide.

With respect to FIG. 1A, there is shown a cross-sectional side view of a waveguide system 100 having an optical element 102, a diffracting structure 106, and a waveguide 104, according to an embodiment. It should be understood that the following description of the waveguide system 100 is but one manner of a variety of different manners in which such a waveguide system 100 may be configured. In addition, it should be understood that the waveguide system 100 may include additional elements and devices not shown in FIG. 1A and that some of the features described herein may be removed and/or modified without departing from a scope of the waveguide system 100.

The optical element 102 may be any reasonably suitable device for emitting or receiving light. Suitable light emitting devices include, for example, LEDs, lasers, and the like. In one example, a high speed LED (HSLED) may be used. The term HSLED refers to LEDs which emit light at a rate greater than about 1 Gigabyte per second (GB/s). For example, the HSLEDs may emit light at, or above, 2 or 3 GB/s. Therefore, a person having ordinary skill in the art will appreciate that the optical element 102 shown in FIG. 1A is only a general representation and that the optical element 102 may include many other features not specifically illustrated in FIG. 1A, such as semiconductor layers, quantum wells, electrodes, devices for inducing current flow, etc.

The light emitted by the optical element 102 may contact the diffracting structure 106, which is a three-dimensional structure configured to diffract light for efficient coupling to the waveguide 104. FIG. 1A shows light 108 emitted from the optical element 102 and diffracted into the waveguide 104 for efficient transmission. The arrows representing the light 108 are double headed to illustrate that the optical element 102 may comprise a light emitting device or a light receiver for receiving the light 108.

The term "three-dimensional" refers to the varying elevation or height of the diffracting structure 106, which in FIG. 1A is a stepped structure escalating away from the optical element. That is, the diffracting structure 106 resembles a staircase with the lowest level, in relation to the optical element, nearest the optical element and the highest level located the farthest away from the optical element 102 and nearest the waveguide 104. The angles of the diffracting structure 106, shown in FIG. 1A, are approximately 90 degrees. However, the diffracting structure 106 may have other angles and configurations. In fact, the dimensions of the diffracting structure 106, such as height, angle, and length, may be altered to efficiently transmit different wavelengths of light in the waveguide 104 by coupling the light into the main waveguide mode, such as the fundamental mode or its higher order modes. The dimensions of the diffracting structure 106 may range from about $\lambda/2$ to about $\lambda/4$ of the wavelength of the light emitted from the optical element 102. For example, the step height can be designed to diffract the fundamental mode or its higher order modes into the waveguide. However, in one embodiment, the diffracting structure 106 is designed so that a substantial amount of the energy is diffracted into the fundamental mode that is paraxial to the hollow waveguide for the lowest loss propagation.

In other embodiments, the optical element 102 may be a device for receiving light. Suitable devices for receiving light include detectors, such as photodetectors, filters, such as dichroic mirrors, and the like. In these embodiments, light may propagate towards the optical element 102, and the diffracting structure 106 may facilitate the transmission of the light into the optical element 102. Thus, the waveguide systems 100 may essentially operate in reverse of the emitting embodiments described above. That is, the diffracting structure 106 may ensure that a maximum amount of light is channeled into the optical element 102.

As mentioned above, the waveguide system 100 is integrated because the optical element 102 and the diffracting structure 106 are at least partially enclosed by the waveguide 104. The phrase "at least partially enclosed," as used herein, means that the waveguide 104 surrounds at least a portion of the optical element 102 and the diffracting structure 106. For instance, the waveguide 104 may surround at least the light emitting or receiving region of the optical element 102 and an uppermost portion of the diffracting structure 106, as shown in FIG. 1A. While the entire optical element 102 and diffracting structure 106 may be enclosed by the waveguide 104, as shown in FIG. 1A, in other embodiments, portions of both the optical element 102 and the diffractive structure 106 may not be enclosed by the waveguide 104.

With respect to FIG. 1B, there is shown a cross-sectional top view 100' of the waveguide system 100, shown in FIG. 1A, having the optical element 102, the diffracting structure 106, and the waveguide 104, according to an embodiment. According to this embodiment, the diffracting structure 106 is substantially circular. That is, the diffracting structure 106 surrounds the optical element 102 in a series of escalating rings. Similarly, as FIG. 1B illustrates, the waveguide 104 is a substantially circular structure. In one embodiment, the waveguide 104 may have a cylindrical configuration, such that one dimension is substantially larger than another dimension. For instance, the waveguide 104 may be a hollow tube having at least a portion of the optical element 102 and the diffracting structure 106 positioned inside the waveguide 104. The waveguide 104 may be formed from any reasonably suitable materials, such as metal, or plastic, glass, semiconductor materials, etc. The internal surfaces of the waveguide 104 may be coated with metal to increase the confinement of the light inside the waveguide 104. Similarly, the diffracting structure 106 may be formed from any reasonably suitable materials including semiconductor materials, such as glass, silicon, silicon compounds, etc.

Figure 1C:
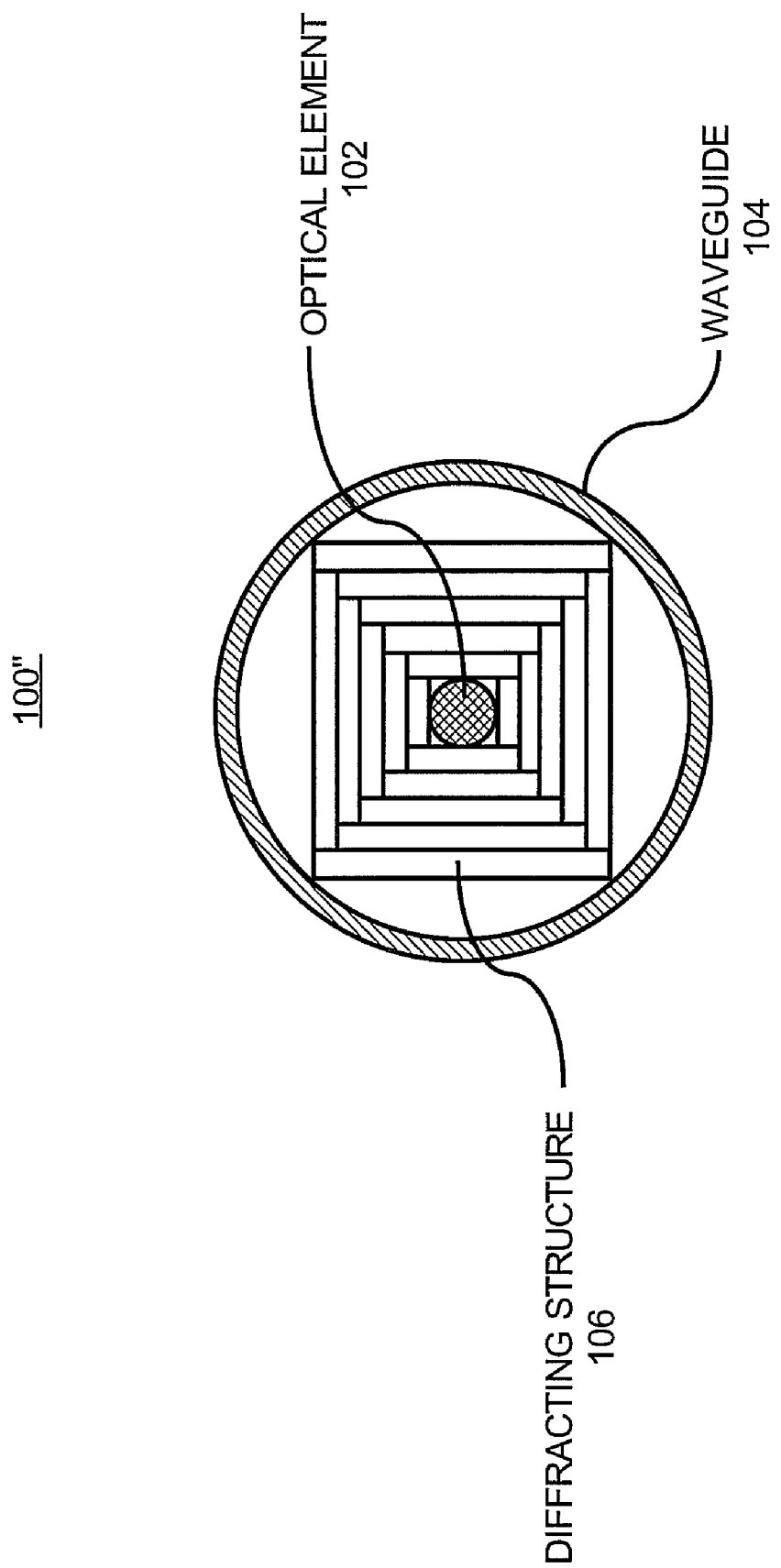
FIG. 1C illustrates a cross-sectional top view of a waveguide system, according to another embodiment.

With respect to FIG. 1C, there is shown a cross-sectional top view 100" of the waveguide system 100, shown in FIG. 1A, having the optical element 102, the diffracting structure 106, and the waveguide 104, according to another embodiment. According to the embodiment shown in FIG. 1C, the diffracting structure 106 comprises a substantially square or rectangular configuration. That is, the diffracting structure 106, shown in FIG. 1C, has a series of rectangular blocks on each side of the optical element 102. In this embodiment, the optical element resembles a stage and the diffracting structure 106 resembles four sets of bleachers surrounding the stage, which successively escalate as they extend away from the stage. That is, as shown in the FIG. 1A, the rectangular blocks increase in elevation in each successive layer away from the optical element 102. It should be understood that while the optical element 102 is represented in FIGS. 1B and 1C as having a substantially circular configuration, the optical element 102 may have any other reasonably suitable configuration, such as square, rectangular, etc.

Figure 2:
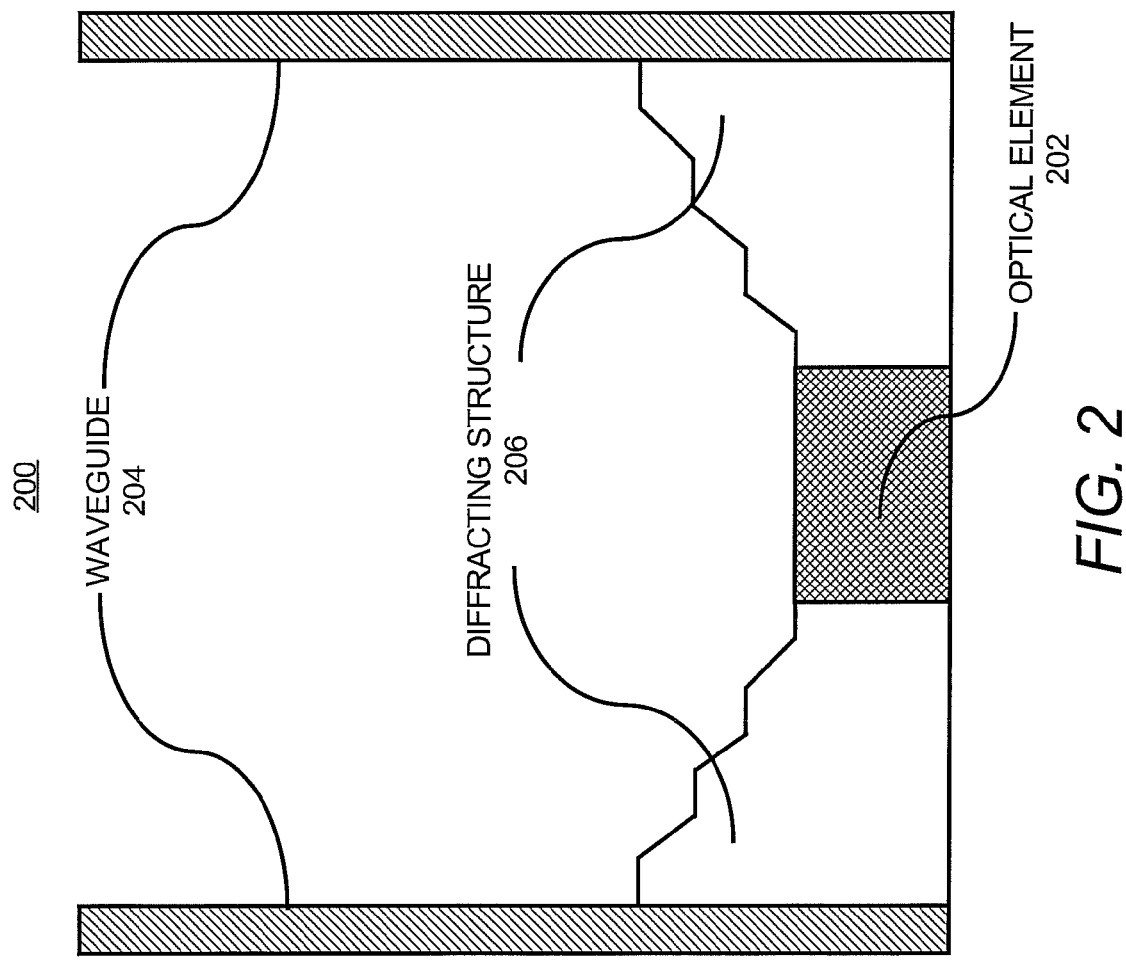
FIG. 2 illustrates a cross-sectional side view of a waveguide system, according to another embodiment.

With respect to FIG. 2, there is shown a cross-sectional side view of a waveguide system 200 having an optical element 202, a diffracting structure 206, and a waveguide 204, according to an embodiment. It should be understood that the following description of the waveguide system 200 is but one manner of a variety of different manners in which such a waveguide system 200 may be configured. In addition, it should be understood that the waveguide system 200 may include additional elements and devices not shown in FIG. 2 and that some of the features described herein may be removed and/or modified without departing form a scope of the waveguide system 200.

The waveguide system 200 is similar to the waveguide system 100, shown in FIGS. 1A-1C, in that the waveguide system 200 is integrated, because the optical element 202 and the diffracting structure 206 are at least partially enclosed by the waveguide 204. Similarly, the waveguide 204 and the optical element 202 may be substantially similar to the waveguide 104 and the optical element 102 shown in FIGS 1A-1C. Like the diffracting structure 106 of FIGS. 1A-1C, the diffracting structure 206 is a three-dimensional structure escalating away from the optical element 202. However, the diffracting structure 206 comprises a stepped structure having angles of approximately 45 degrees. The purpose of FIG. 2 is to illustrate that the diffracting structure 206 may have other configurations. As set forth above, the dimensions of the diffracting structure 206 may be modified to enhance the coupling of different wavelengths of light to the waveguide 204. Therefore, the diffracting structure 106, shown in FIG. 1A, and the diffracting structure 206, shown in FIG. 2, are configured to couple different wavelengths of light. Although not illustrated by a top cross-sectional view, the diffracting structure 206 of the waveguide structure 200 may have either a circular or rectangular profile, similar to FIGS. 1B and 1C, respectively.

Figure 3:
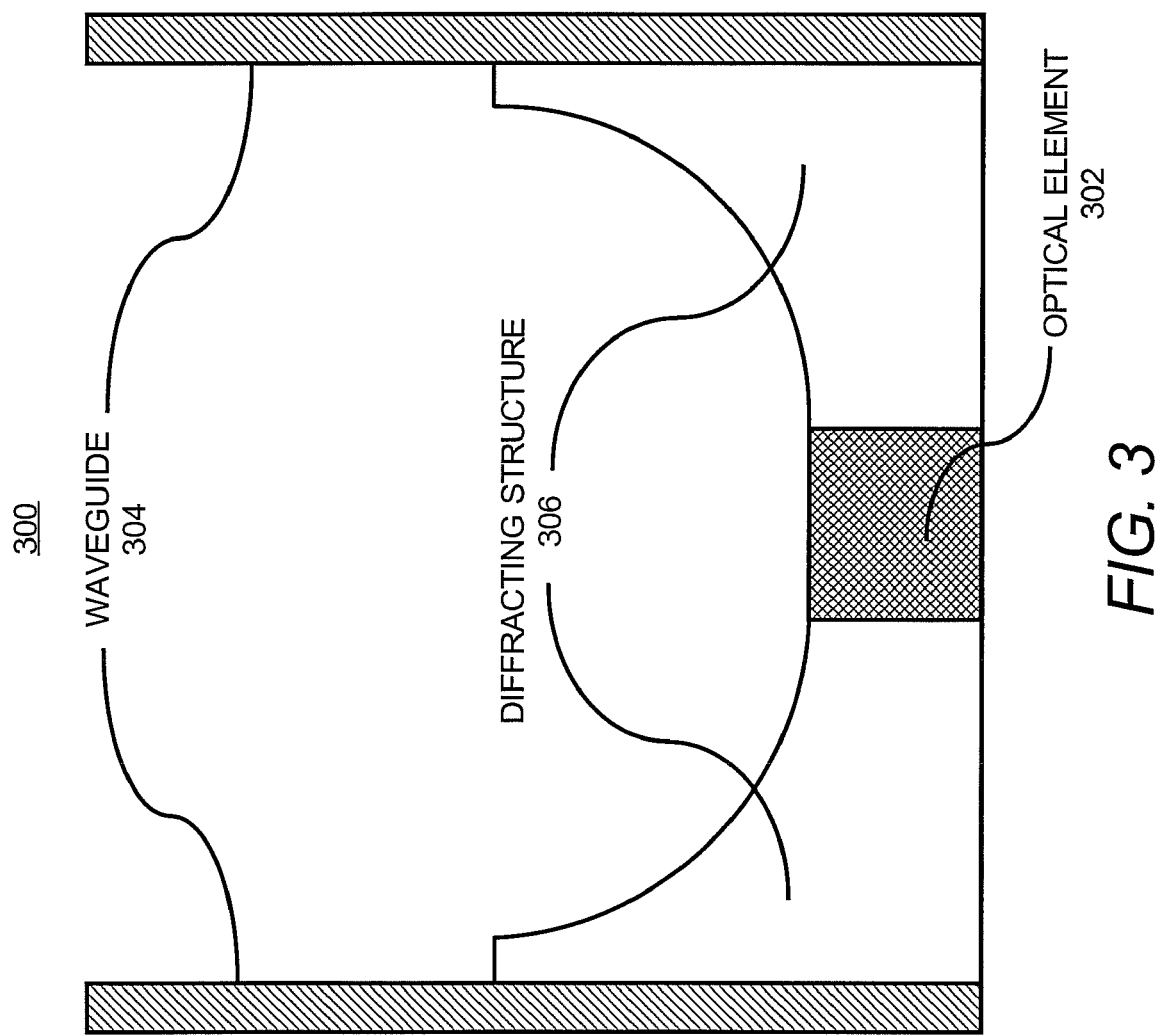
FIG. 3 illustrates a cross-sectional side view of a waveguide system, according to another embodiment.

With respect to FIG. 3, there is shown a cross-sectional side view of a waveguide system 300 having an optical element 302, a diffracting structure 306, and a waveguide 304, according to an embodiment. It should be understood that the following description of the waveguide system 300 is but one manner of a variety of different manners in which such a waveguide system 300 may be configured. In addition, it should be understood that the waveguide system 300 may include additional elements and devices not shown in FIG. 3 and that some of the features described herein my be removed and/or modified without departing from a scope of the waveguide system 300.

The waveguide system 300 is similar to the waveguide systems 100 and 200, shown in FIGS. 1A-2, in that the waveguide system 300 is integrated, because the optical element 302 and the diffracting structure 306 are at least partially enclosed by the waveguide 304. Similarly, the waveguide 304 and the optical element 302 may be substantially similar to the waveguide 104 and the optical element 102 shown in FIGS. 1A-1C. Like the diffracting structure 106 of FIGS. 1A-1C, the diffracting structure 306 is a three-dimensional structure escalating away from the optical element 302. However, the diffracting structure 306 comprises a parabolic curve escalating away from the optical element 302. Like FIG. 2, the purpose of FIG. 3 is to illustrate that the diffracting structure 306 may have other configurations. As set forth above, the dimensions of the diffracting structure 306 may be modified to enhance the coupling of different wavelengths of light to the waveguide 304. Therefore, the diffracting structures 106 and 206, shown in FIGS. 1A and 2, respectively, and the diffracting structure 306, shown in FIG. 3, are configured to couple different wavelengths of light. Moreover, the parabolic curve structure shown in FIG. 3 may also reflect light away from the optical element 302 and/or into the optical element 302.

Figure 4:
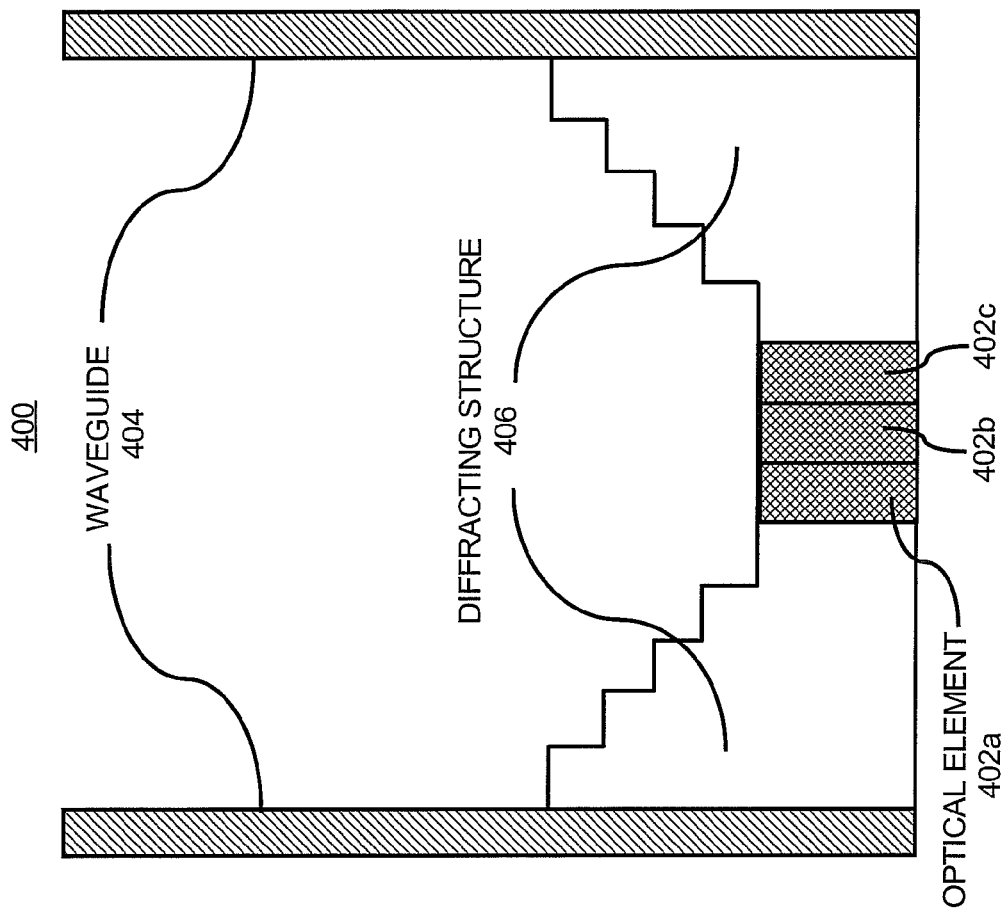
FIG. 4 illustrates a cross-sectional side view of a waveguide system having an array of optical elements, according to an embodiment.

With respect to FIG. 4, there is shown a cross-sectional side view of a waveguide system 400 having an array of optical elements 402a-402c, according to an embodiment. It should be understood that the following description of the waveguide system 400 is but one manner of a variety of different manners in which such a waveguide system 400 may be configured. In addition, it should be understood that the waveguide system 400 may include additional elements and devices not shown in FIG. 4 and that some of the features described herein may be removed and/or modified without departing from a scope of the waveguide system 400.

The waveguide system 400 is similar to the waveguide systems 100, 200, and 300, shown in FIGS. 1A-3, in that the waveguide system 400 is integrated, because the optical elements 402a-402c and the diffracting structure 406 are at least partially enclosed by the waveguide 404. Similarly, the waveguide 404 and the diffracting structure 406 may be substantially similar to the waveguide 104 and the diffracting structure 106 shown in FIGS. 1A-1C.

However, the waveguide structure 400 includes an array of optical elements 402a-402c, which may be three light emitting devices or light receiving devices. The term "array," as used herein, refers to a grouping of similar elements. Therefore, while three different optical elements 402a-402c are illustrated in FIG. 4, it should be understood that the waveguide system 400 may include two, four, or more optical elements 402a-402c. For example, the array of the waveguide system 400 may include any reasonably suitable number of LED's, which may be configured to emit similar or different wavelengths of light. Similarly, the array of the waveguide system 400 may include any reasonably suitable number of detectors or filters configured to receive similar or different wavelengths of light.

Figure 5:
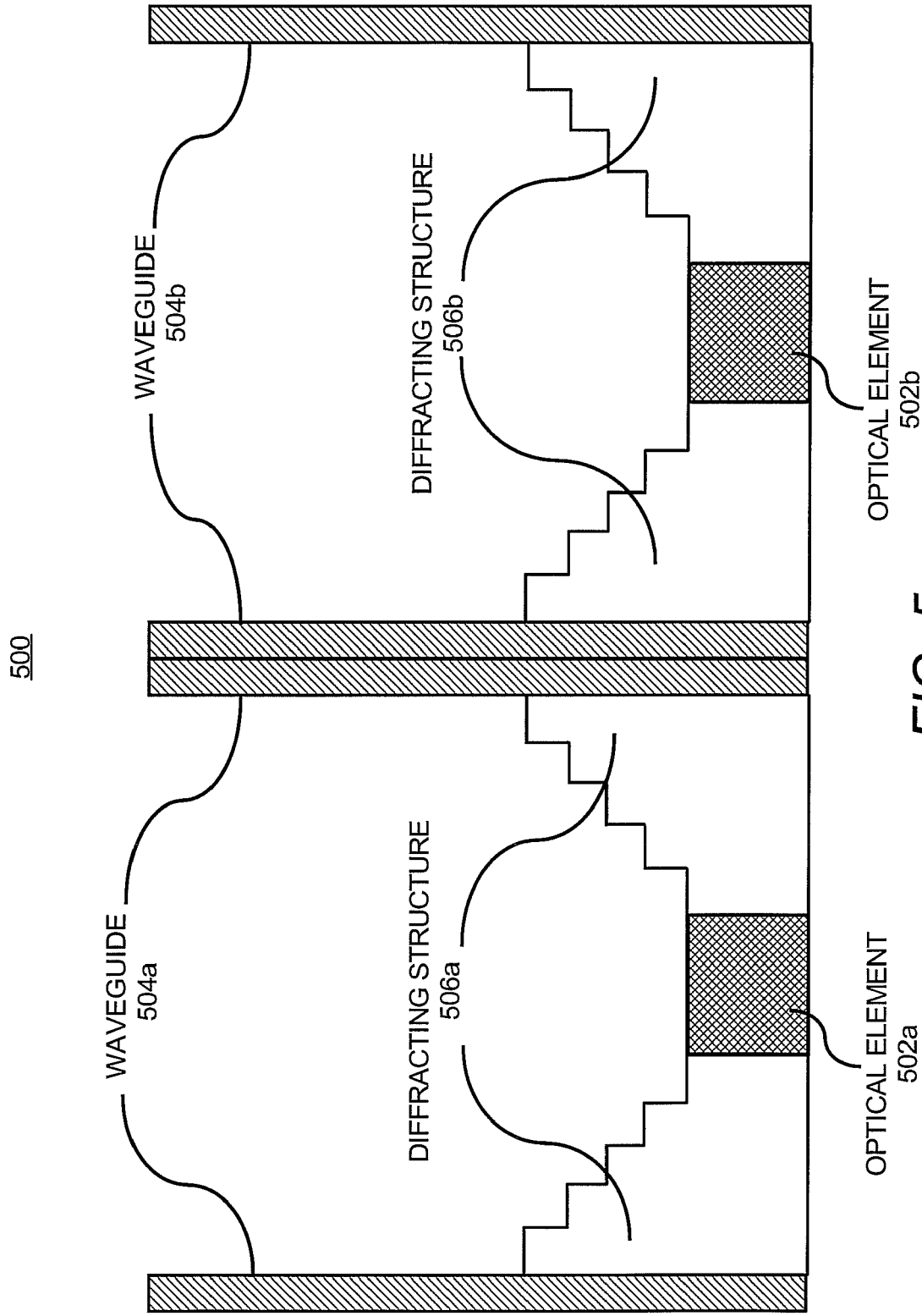
FIG. 5 illustrates a cross-sectional side view of a waveguide system array, according to an embodiment.

With respect to FIG. 5, there is shown a cross-sectional side view of a waveguide system array 500 having multiple integrated waveguide structures, according to an embodiment. It should be understood that the following description of the waveguide system array 500 is but one manner of a variety of different manners in which such a waveguide system array 500 may be configured. In addition, it should be understood that the waveguide system array 500 may include additional elements and devices not shown in FIG. 5 and that some of the features described herein may be removed and/or modified without departing from a scope of the waveguide system array 500.

The waveguide system array 500 comprises two integrated waveguide structures, each having an optical element 502a and 502b and a diffracting structure 506a and 506b at least partially enclosed by a waveguide 504a and 504b. Thus, the waveguide system array 500 may be substantially similar to two of the waveguide system 100, shown in FIGS. 1A-C combined together. The optical elements 502a and 502b may be configured to emit and receive different or similar wavelengths of light. Therefore, although the diffracting structures 506a and 506b appear similar in FIG. 5, the diffracting structures 506a and 506b may have different dimension, such that they are configured to couple different wavelengths of light. The waveguide system array 500 may also include an array of optical elements with one or more of the integrated waveguide structures. The waveguide system array 500 may include more than two waveguides, optical elements and diffracting structures.

Figure 6:
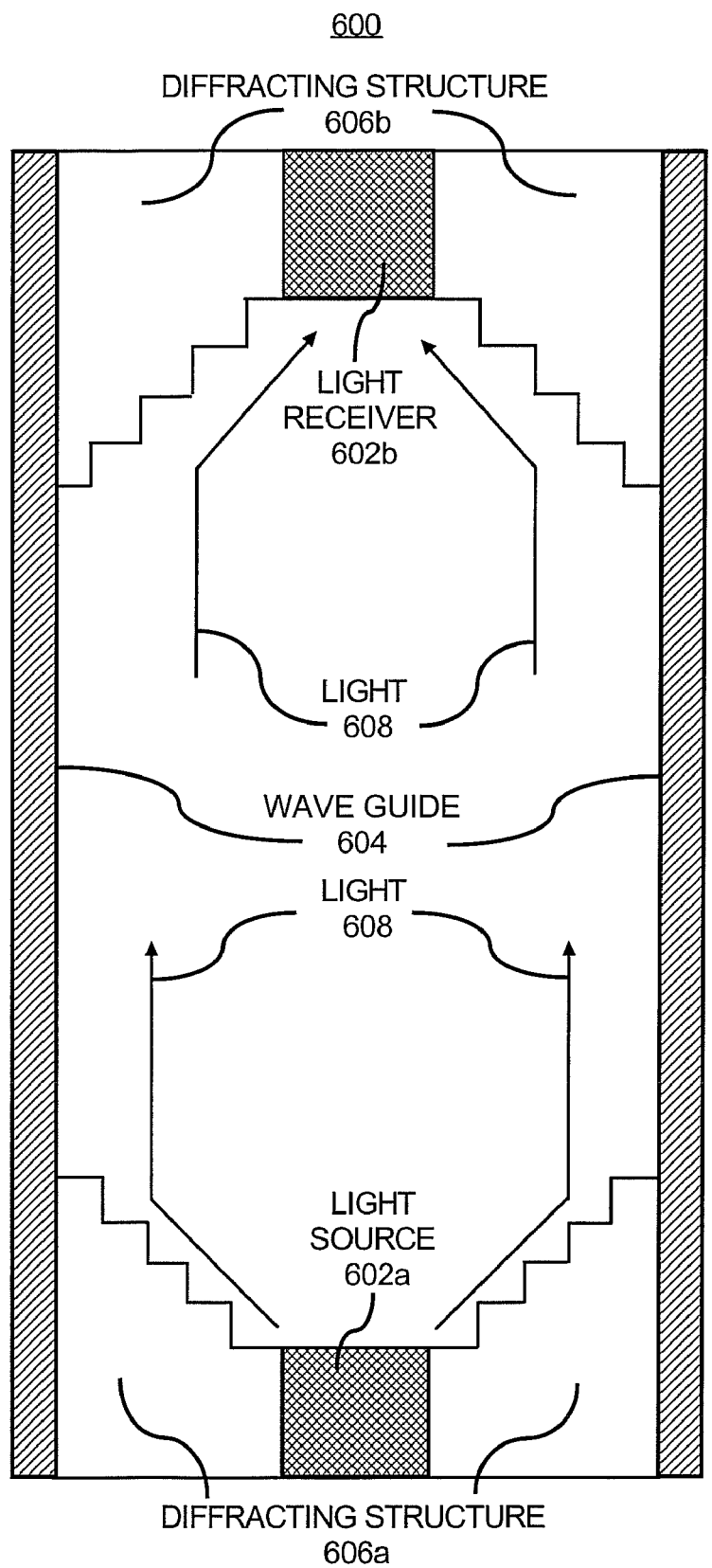
FIG. 6 illustrates a cross-sectional side view of a waveguide system having an optical emitter and receiver, according to an embodiment.

With respect to FIG. 6, there is shown a cross-sectional side view of a waveguide system 600 having a light source 602a and a light receiver 602b, according to an embodiment. It should be understood that the following description of the waveguide system 600 is but one manner of a variety of different manners in which such a waveguide system 600 may be configured. In addition, it should be understood that the waveguide system 600 may include additional elements and devices not shown in FIG. 6 and that some of the features described herein may be removed and/or modified without departing from a scope of the waveguide system 600.

The waveguide system 600 comprises an integrated waveguide structure where the light source 602a and the light receiver 602b are each associated with a diffracting structure 606a and 606b and are at least partially enclosed by a waveguide 604. The waveguide system 600 may be used to transmit light 608 from the light source 602a to the light receiver 602b. For instance, the light source 602a and the light receiver 602b may each be associated with an electronic device, such as a circuit board. The transmitted light 608 may be used to communicate information from the electronic device associated with the light source to the electronic device associated with light receiver 602b.

Figure 7:
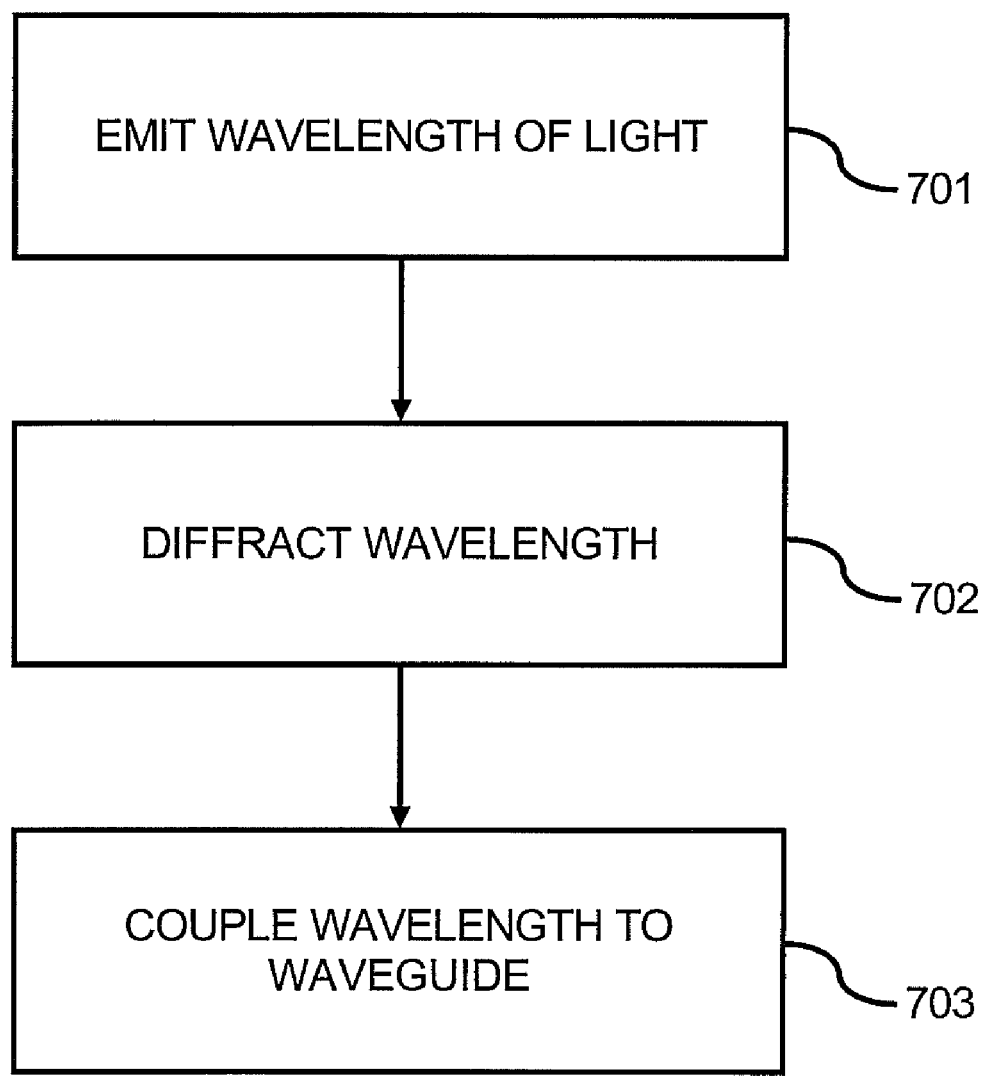
FIG. 7 illustrates a flow chart of a method for transmitting light, according to an embodiment.

Turning now to FIG. 7, there is shown a flow diagram of a method 700 for transmitting a wavelength of light, according to an embodiment. It is to be understood that the following description of the method 700 is but one manner of a variety of different manners in which an example of the invention may be practiced. It should also be apparent to those of ordinary skill in the art that the method 700 represents a generalized illustration and that other steps may be added or existing steps may be removed, modified or rearranged without departing from a scope of the method 700.

The description of the method 700 is made with reference to the waveguide systems 100, 200, and 300 illustrated in FIGS. 1A-3 and thus makes reference to the elements cited therein. It should, however, be understood that the method 700 is not limited to the waveguide systems 100, 200, and 300. Instead, it should be understood that the method 700 may be used with systems having a different configuration than the waveguide systems 100, 200, and 300 set forth in FIGS. 1A-3.

The method 700 may be initiated at step 701 where a wavelength of light is emitted from a light source. The light source may be the optical elements 102, 202, or 302, illustrated in FIGS. 1A-3, and thus, may include an LED, laser, or the like. The light source may also include an array of optical elements, similar to the array shown in FIG. 4.

At step 702, the wavelength emitted from the light source is diffracted by a three-dimensional diffracting structure, which may be similar to the diffracting structures 106, 206, and 306, shown in FIGS. 1A-3. However, the diffracting structure may have any reasonably suitable dimensions, which are configured to diffract and couple any reasonably suitable wavelength of light. The diffracting structure may be positioned around the optical element to efficiently diffract the light emitted from the optical element.

At step 703, the wavelength of light emitted from the optical element is coupled to a waveguide, which at least partially encloses the light source and the diffracting structure. The wavelength may be coupled to the fundamental mode of the waveguide or its harmonics to efficiently propagate the wavelength with low loss and high fidelity for a selected waveguide.

The transmitted wavelength may be used to communicate data between electronic devices. Therefore, the structures described herein may be used as photonic interconnects. For example, the electronic devices may include circuit boards and the like, which transmit data to other electronic devices via light.

Figure 8:
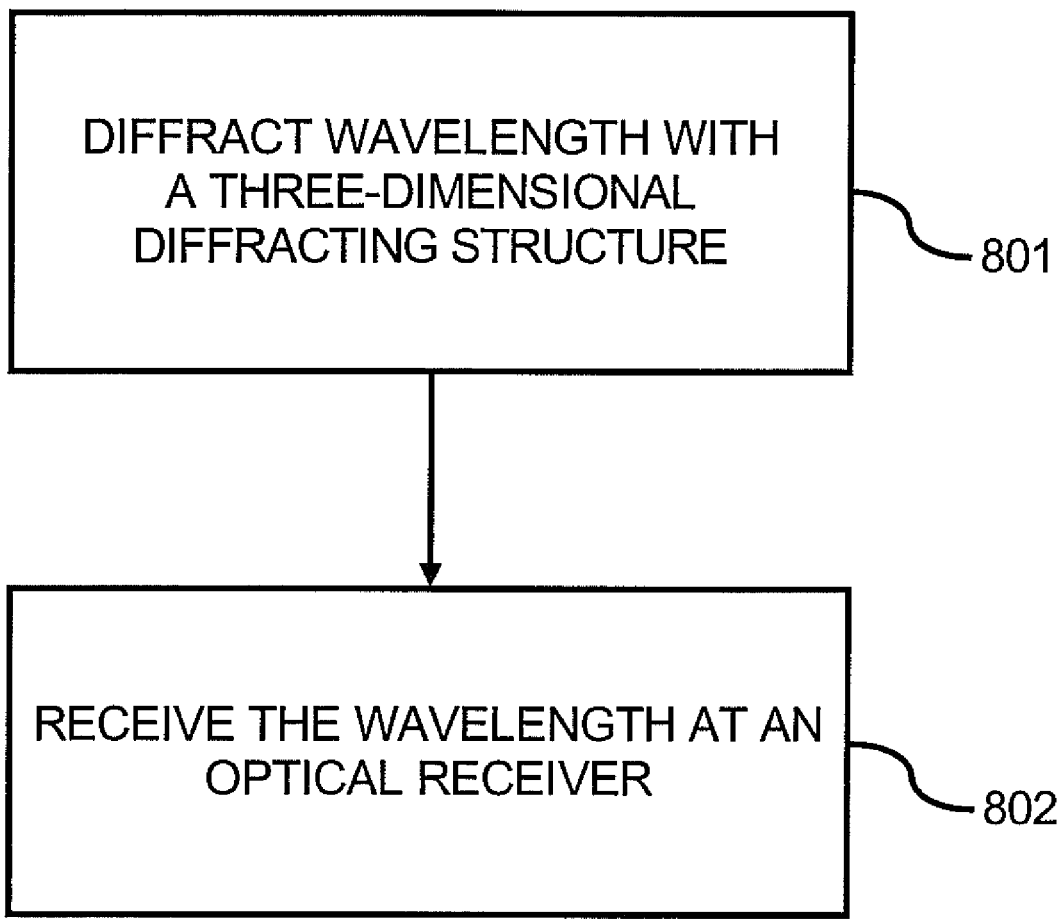
FIG. 8 illustrates a flow chart of a method for receiving light, according to an embodiment.

Turning now to FIG. 8, there is shown a flow diagram of a method 800 for receiving a wavelength of light, according to an embodiment. It is to be understood that the following description of the method 800 is but one manner of a variety of different manners in which an example of the invention may be practiced. It should also be apparent to shoe of ordinary skill in the art that the method 800 represents a generalized illustration and that other steps may be added or existing steps may be removed, modified or rearranged without departing from a scope of the method 800.

The description of the method 800 is made with reference to the waveguide systems 100, 200, and 300 illustrated in FIGS. 1A-3 and thus makes reference to the elements cited therein. It should, however, be understood that the method 800 is not limited to the waveguide systems 100, 200, and 300. Instead, it should be understood that the method 800 may be used with systems having a different configuration than the waveguide systems 100, 200, and 300 set forth in FIGS. 1A-3.

The method 800 may be initiated at step 801 where a wavelength of light is diffracted by a three-dimensional diffracting structure to direct the wavelength towards an optical receiver. The optical receiver may be any device for receiving light, such as a photo detector or a filter. The diffracting structure and the optical receiver may be integrated into a waveguide. Therefore, the wavelength may propagate through the waveguide towards the optical receiver.

At step 802, the wavelength is received by the optical receiver. The wavelength may be used to communicate data between electronic devices.

While the forgoing description has been described in terms of a three-dimensional diffracting optical element, those skilled in the art will appreciate that the diffracting structures described herein may comprise a hologram. That is, the diffracting structures may be a substantially flat element, which replicates a three-dimensional structure.

What has been described and illustrated herein are preferred examples of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims and their equivalents in which all terms are meant in their broadest reasonable sense unless otherwise indicated.

What is claimed is:

1. An optical waveguide system comprising:
   at least one optical element configured to emit light;
   a three-dimensional diffracting structure positioned around the at least one optical element, wherein the diffracting structure comprises a series of rectangular rings successively escalating as the rings extend away from the light source; and
   a waveguide, wherein the at least one optical element and the diffracting structure are at least partially enclosed by the waveguide and the waveguide is configured to be coupled to an optical receiver configured to detect or filter the light.

2. The system of claim 1, wherein the at least one optical element comprises a light emitting diode (LED), which is operable to emit light.

3. The system of claim 1, further comprising the optical receiver.

4. The system of claim 1, wherein the waveguide comprises a cylindrical metal structure.

5. The system of claim 1, wherein the waveguide is substantially hollow.

6. The system of claim 1, wherein a wavelength of light emitted by the at least one optical element is coupled to the fundamental mode of the waveguide.

7. The system of claim 1, wherein the at least one optical element comprises:
   a plurality of optical elements arranged in an array.

8. The system of claim 7, further comprising:
   a plurality of diffracting structures and waveguides arranged in an array of integrated waveguide structures.

9. The system of claim 1, wherein the waveguide is a multimode waveguide configured to propagate different wavelengths of light.

10. A method of using an optical waveguide in an optical waveguide system comprising:
    propagating a wavelength of light from a light source through the optical waveguide;
    diffracting the wavelength of the light propagated through the optical waveguide with a three-dimensional diffracting structure to direct the wavelength of the light towards an optical receiver, wherein the diffracting structure comprises a series of rings successively escalating as the rings extend away from the light source; and
    receiving the wavelength of the light at the optical receiver, wherein the optical receiver and the diffracting structure are at least partially enclosed by the waveguide.

11. The method of claim 10, further comprising:
    emitting the light from the light source; and
    diffracting the light with a second three-dimensional diffracting structure, wherein propagating a wavelength of light from a light source comprises propagating the light diffracted with the second three-dimensional diffracting structure.

12. The method of claim 10, wherein the wavelength of light emitted by the light source is a fundamental mode of the waveguide.

13. The method of claim 10, further comprising:
    transmitting the wavelength from the light source to the optical receiver to communicate data between an electronic device associated with the light source and an electronic device associated with the optical receiver.

14. The method of claim 10, further comprising:
emitting a wavelength of light from a plurality of light sources arranged in an array.

15. An optical waveguide system comprising:
at least one light source operable to emit a wavelength of light;
a three-dimensional diffracting structure positioned around the light source;
a light receiver; and
a waveguide, wherein the light source, the diffracting structure, and the light receiver are at least partially enclosed by the waveguide; and
another three-dimensional diffracting structure positioned around the light receiver and configured to guide light into the light receiver, wherein the another three-dimensional diffracting structure comprises a series of rings successively escalating as the rings extend away from the light source.

16. The optical waveguide system of claim 15, further comprising:
a first electronic device associated with the light source; and
a second electronic device associated with the light receiver, wherein the wavelength emitted by the light source is configured to communicate data from the first electronic device to the second electronic device.

* * * * *

UNITED STATES PATENT AND TRADEMARK OFFICE
CERTIFICATE OF CORRECTION

PATENT NO. : 7,546,012 B2 Page 1 of 1
APPLICATION NO. : 11/876958
DATED : June 9, 2009
INVENTOR(S) : Alexandre M. Bratkovski et al.

It is certified that error appears in the above-identified patent and that said Letters Patent is hereby corrected as shown below:

In column 4, line 39, delete "form" and insert -- from --, therefor.

In column 5, line 6, delete "my" and insert -- may --, therefor.

In column 6, line 23, delete "with" and insert -- within --, therefor.

In column 7, line 34, delete "shoe" and insert -- those --, therefor.

Signed and Sealed this

Thirtieth Day of March, 2010

David J. Kappos
*Director of the United States Patent and Trademark Office*